US012781841B2

(12) United States Patent
Kapoor et al.

(10) Patent No.: US 12,781,841 B2
(45) Date of Patent: Nov. 3, 2026

(54) ELECTRONIC LIMITED SLIP DIFFERENTIAL CONTROL SYSTEM

(71) Applicant: GM GLOBAL TECHNOLOGY OPERATIONS LLC, Detroit, MI (US)

(72) Inventors: Saurabh Kapoor, Windsor (CA); Hassan Askari, Thornhill (CA); Mustafa Hakan Turhan, Kitchener (CA); Nauman Sohani, Ann Arbor, MI (US); SeyedAlireza Kasaiezadeh Mahabadi, Novi, MI (US); Kenneth William Lampert, Royal Oak, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 420 days.

(21) Appl. No.: 18/381,743

(22) Filed: Oct. 19, 2023

(65) Prior Publication Data

US 2025/0129839 A1 Apr. 24, 2025

(51) Int. Cl.

| | |
|---|---|
| ***F16H 48/34*** | (2012.01) |
| ***F16H 48/20*** | (2012.01) |
| ***F16H 48/22*** | (2006.01) |

(52) U.S. Cl.

CPC ............ *F16H 48/34* (2013.01); *F16H 48/22* (2013.01); *F16H 2048/205* (2013.01); *F16H 2048/207* (2013.01)

(58) Field of Classification Search

CPC .... F16H 48/34; F16H 48/22; F16H 2048/205; F16H 2048/207; F16H 48/20;

(Continued)

(56) References Cited

U.S. PATENT DOCUMENTS

| | | | |
|---|---|---|---|
| 9,469,199 | B1 | 10/2016 | Gauthier |
| 2002/0105188 | A1 | 8/2002 | Tomikawa |

(Continued)

FOREIGN PATENT DOCUMENTS

| | | | |
|---|---|---|---|
| CN | 106314204 | A | 1/2017 |
| CN | 107640062 | A | 1/2018 |

(Continued)

OTHER PUBLICATIONS

Machine Translation of CN115973130A PDF File Name: "CN115973130A_Machine_Translation.pdf" (Year: 2023).*

(Continued)

*Primary Examiner* — Grant Moubry
*Assistant Examiner* — Ruben Picon-Feliciano

(57) ABSTRACT

An eLSD control system includes: an eLSD configured to adjust torque to shafts of an axle of a vehicle; a preemptive planar coordinator module configured to determine targets for an eLSD clutch torque and generate a first clutch torque request based on the targets; a direct yaw feedback control module configured to track a target yaw rate for the vehicle, determine a yaw rate error, and generates a second clutch torque request to reduce the yaw rate error; a wheel stability control module configured to generate a third clutch torque request to minimize at least one of i) slip between wheels of the axle, and ii) slip on one of the wheels experiencing higher traction; and a core arbitration clutch response module configured to control the eLSD clutch torque of the eLSD based on the first clutch torque request, the second clutch torque request, and the third clutch torque request.

20 Claims, 8 Drawing Sheets

(58) Field of Classification Search
CPC ............... F16H 2048/204; F16H 61/00; F16H 61/0202; F16H 63/46; F16H 2061/0012; F16H 2312/08; B60K 17/354
See application file for complete search history.

(56) References Cited

U.S. PATENT DOCUMENTS

| | | | | |
|---|---|---|---|---|
| 2004/0176899 | A1 | 9/2004 | Hallowell | |
| 2005/0060079 | A1 | 3/2005 | Phillips et al. | |
| 2007/0184929 | A1 * | 8/2007 | Piyabongkarn | F16H 48/08 475/84 |
| 2016/0214603 | A1 * | 7/2016 | Owen | B60W 30/02 |
| 2019/0077258 | A1 | 3/2019 | Cho | |
| 2019/0092188 | A1 | 3/2019 | Plianos et al. | |

FOREIGN PATENT DOCUMENTS

| | | | | |
|---|---|---|---|---|
| CN | 108909529 | A | 11/2018 | |
| CN | 114940209 | A * | 8/2022 | B62D 11/08 |
| CN | 115973130 | A * | 4/2023 | |
| DE | 10049567 | A1 | 10/2001 | |
| DE | 102011056168 | A1 | 6/2013 | |
| DE | 102012201250 | A1 | 8/2013 | |
| DE | 102020105938 | A1 | 10/2020 | |
| DE | 102020216118 | A1 | 6/2022 | |

OTHER PUBLICATIONS

Machine Translation of CN 114940209 A PDF File Name: "CN114940209A_Machine_Translation.pdf" (Year: 2022).*
U.S. Appl. No. 18/381,914, filed Oct. 19, 2023, Saurabh Kapoor.
Office Action dated Jun. 5, 2024 from German Patent Office for German Patent No. 102023135431.0; 4pgs.
Reze Hajiloo, Amir Khajepour, Alireza Kasaiezadeh, Shih-Ken Chen, Bakhtiar Litkouhi: A Model Predictive Control of Electronic Limited Slip Differential and Differential Braking for Improving Vehicle Yaw Stability. In: IEEE Transactions on Control Systems Technology, , vol. 31, No. 2, Mar. 2023, Seite 797-808. https://ieeexplore.ieee.org/stamp/stamp.jsp?tp=&arnumber=9897086 [abgerufen am May 6, 2024]; 13pgs.
Office Action dated May 3, 2024 from German Patent Office for German Patent No. 102023134688.1; 7pgs.

* cited by examiner

ELECTRONIC LIMITED SLIP DIFFERENTIAL CONTROL SYSTEM

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to electronic limited slip differentials (eLSDs).

A vehicle can include one or more axles having one or more eLSDs. An eLSD determines amounts of torque to be provided to each driven wheel of an axle and provides the determined amounts of torque to the driven wheels for improved vehicle stability. The amounts of torque can be provided to adjust amounts of slip of each wheel and/or to adjust amounts of slip in a smooth and measured manner. An eLSD improves handling over various surfaces and in various operating conditions by adjusting levels of torque to each wheel of an axle to maintain safe levels of traction.

SUMMARY

An electronic limited slip differential (eLSD) control system is provided and includes: an eLSD configured to adjust torque to shafts of an axle of a vehicle; a preemptive planar coordinator module configured to determine targets for an eLSD clutch torque and generate a first clutch torque request based on the targets; a direct yaw feedback control module configured to track a target yaw rate for the vehicle, determine a yaw rate error, and generates a second clutch torque request to reduce the yaw rate error; a wheel stability control module configured to generate a third clutch torque request to minimize at least one of i) slip between wheels of the axle, and ii) slip on one of the wheels experiencing higher traction; and a core arbitration clutch response module configured to control the eLSD clutch torque of the eLSD based on the first clutch torque request, the second clutch torque request, and the third clutch torque request.

In other features, the preemptive planar coordinator module is configured to determine a longitudinal target, a yaw moment transient target, and a yaw moment steady-state target and generate the first clutch torque request based on the longitudinal target, the yaw moment transient target, and the yaw moment steady-state target.

In other features, the preemptive planar coordinator module is configured to determine a tractive limits target and based on the tractive limits target generates the first clutch torque request. The targets include the tractive limits target.

In other features, the preemptive planar coordinator module is configured to determine the longitudinal target based on speeds of the wheels, accelerations of the wheels, velocity of a suspension of the vehicle, acceleration of the suspension of the vehicle, and a ride height of the vehicle.

In other features, the preemptive planar coordinator module is configured to determine the longitudinal target as a baseline target that is a function of a torque request for the axle and velocity of the vehicle.

In other features, the preemptive planar coordinator module is configured to determine the longitudinal target based on a steering angle gain and a tire temperature gain.

In other features, the preemptive planar coordinator module is configured to determine the yaw moment transient target based on at least one of a yaw acceleration error or a target yaw acceleration of the vehicle.

In other features, the preemptive planar coordinator module is configured to determine the yaw moment steady-state target to correlate a transfer function between steering angle and a yaw moment of the vehicle.

In other features, the preemptive planar coordinator module is configured to select a maximum of the longitudinal target, the yaw moment transient target, and the yaw moment steady-state target as the first clutch torque request.

In other features, the eLSD control system further includes a powerhop module configured to detect a powerhop event and generate a fourth clutch torque request to minimize duration of the powerhop event. The core arbitration clutch response module is configured to control the eLSD clutch torque of the eLSD based on the fourth clutch torque request.

In other features, the core arbitration clutch response module is configured to prioritize the fourth clutch torque request over the first clutch torque request, the second clutch torque request and the third clutch torque request.

In other features, the eLSD control system further includes a clutch temperature module configured to generate a scalar value based on a temperature of a clutch of the eLSD. The core arbitration clutch response module includes: a first multiplier configured to multiply the scalar value by the first clutch torque request to provide a first product value; a second multiplier configured to multiply the first product value by the fourth clutch torque request to generate a second product value; a first summer configured to sum the second clutch torque request and the third clutch torque request to provide a summed value; and a second summer configured to sum the second product value and the summed value to generate a command to control the eLSD clutch torque of the eLSD.

In other features, a method of controlling an electronic limited slip differential (eLSD) of a vehicle is provided. The method includes: determining targets for an eLSD clutch torque and generating a first clutch torque request based on the targets; tracking a target yaw rate for the vehicle; determining a yaw rate error; generating a second clutch torque request to reduce the yaw rate error; generating a third clutch torque request to minimize at least one of i) slip between wheels of an axle of the vehicle, and ii) slip on a first one of the wheels experiencing higher traction; and controlling the eLSD clutch torque of the eLSD based on the first clutch torque request, the second clutch torque request, and the third clutch torque request.

In other features, the determining the targets includes: calculating an amount of wheel torque overflow of a second one of the wheels experiencing a lower amount of traction; calculating an amount of initial wheel torque at the first one of the wheels based on the amount of the wheel torque overflow; calculating a maximum coupling torque of a clutch of the eLSD; calculating a maximum torque of the first one of the wheels based on the maximum coupling torque; and calculating the first clutch torque request based on the amount of the initial wheel torque and the maximum torque of the first one of the wheels.

In other features, the method further includes: determining whether the amount of the initial wheel torque is greater than the maximum torque of the first one of the wheels; calculating the first clutch torque request based on an overflow torque of the first one of the wheels when the amount of the initial wheel torque is greater than the maximum torque of the first one of the wheels, where the overflow torque of the first one of the wheels is greater than 0; and calculating the first clutch torque request based on a minimum of the amount of the initial wheel torque and the maximum torque of the first one of the wheels.

In other features, the method further includes: tracking lateral motion error based on the yaw rate error and a lateral velocity of the vehicle; and calculating the second clutch torque request based on the lateral motion error.

In other features, the method further includes: determining whether there is a difference in slip between the wheels; determining whether the first one of the wheels is experiencing excessive slip; activating eLSD slip control in response to there being a difference in slip between the wheels and in response to the first one of the wheels experiencing excessive slip, and determining the third clutch torque request based on at least one of a change in slip error and a slip error in the first one of the wheels; and setting the third clutch torque request equal to 0 when there is no difference in slip between the wheels and when the first one of the wheels is not experiencing excessive slip.

In other features, the method further includes: determining a longitudinal target, a yaw moment transient target, and a yaw moment steady-state target; and generating the first clutch torque request based on the longitudinal target, the yaw moment transient target, and the yaw moment steady-state target.

In other features, the method further includes determining a tractive limits target and based on the tractive limits target generates the first clutch torque request, where the targets include the tractive limits target.

In other features, the method further includes: detecting a powerhop event and generating a fourth clutch torque request to minimize duration of the powerhop event; and controlling the eLSD clutch torque of the eLSD based on the fourth clutch torque request.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 7 is a diagram illustrating lateral forces experienced by front and rear wheels of a vehicle;

In the drawings, reference numbers may be reused to identify similar and/or identical elements.

DETAILED DESCRIPTION

Figure 1:
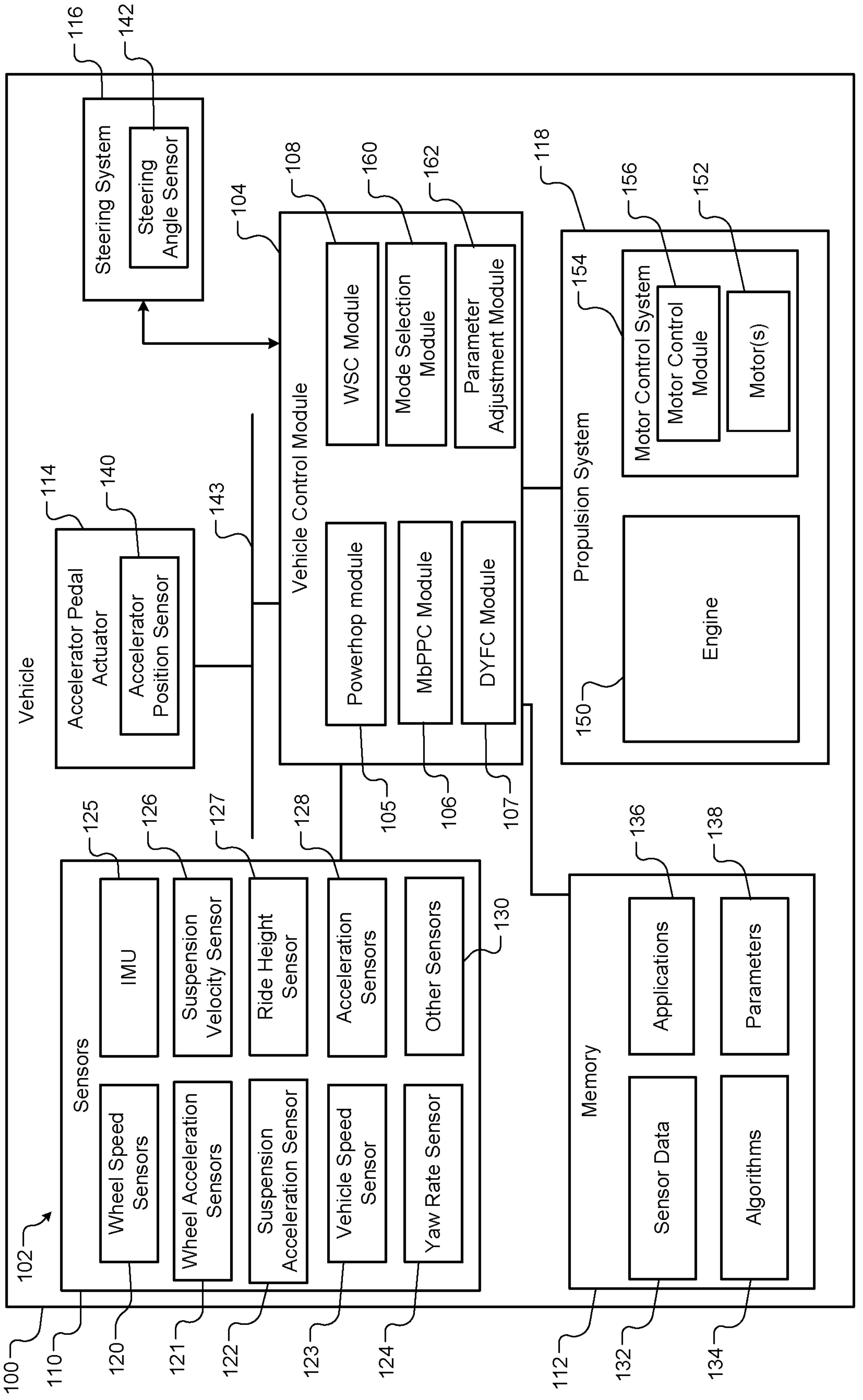
FIG. 1 is a functional block diagram of a vehicle including an example eLSD control system having a vehicle control module with powerhop module, a model-based preemptive planar coordinator (MbPPC) module, a direct yaw feedback control (DYFC) module, and a wheel stability control (WSC) module in accordance with the present disclosure.

Controlling a vehicle with multiple objectives, such as balancing vehicle body stability and wheel stability, poses a significant challenge due to the interaction between the vehicle and road, as well as nonlinear dynamics inherent in the behavior of the vehicle. This complexity is further pronounced by potential existence of conflicting control commands that address different control requirements concurrently. This is especially true in high-performance vehicles.

The examples set forth herein include an eLSD control system that ensures vehicle and wheel stability. This vehicle and wheel stability is provided during high performance driving conditions by controlling states of one or more eLSDs. The eLSD control system includes seamless integration and operation of four sub-control modules to provide a control architecture and corresponding methodology of operation that mitigate conflicting control commands and harmonize various control requirements. The control architecture and methodology control the one or more eLSDs to significantly enhance vehicle body control and wheel stability control.

The control architecture includes integration of the four sub-control modules, namely a powerhop module, a MbPPC module, a DYFC module, and a WSC module. This control architecture provides precise torque distribution to driven wheels for improved overall vehicle stability. The sub-control modules (or sub-controllers) may be incorporated into a single vehicle control module (or controller), which has prioritization capability based on a disclosed arbitration process. As an example, powerhop events may be given a highest priority over other performance events, allowing for prompt and effective response to the powerhop events. A powerhop event refers to an event when a vehicle is accelerated too quickly over, for example, a bumpy surface and wheels of the vehicle hop at a high frequency while accelerating.

The MbPPC module establishes a baseline target level of eLSD clutch torque. For a rear axle of a vehicle having an eLSD, this baseline target level of eLSD clutch torque may be determined while authority of the DYFC module is reduced and when a wheel of an axle experiencing a higher level of traction (e.g., an outside rear wheel of a rear axle during a turn) experiences slip. The WSC module is configured to influence the MbPPC module, ultimately determining a final eLSD clutch torque arbitration amount based on outputs of three of the sub-control modules (i.e., outputs of the MbPPC module, the DYFC module, and the WSC module). The outputs may be combined as described below and used to provide the final eLSD clutch torque arbitration amount. With the integration of the sub-control modules, the disclosed control methodology provides precise torque distribution and prioritizes critical events.

The examples disclosed herein enhance both vehicle body control and slip control. The control architecture systematically provides eLSD clutch torque to improve overall vehicle stability. The examples provide a hybrid strategy that combines preemptive and reactive control algorithms to effectively arbitrate diverse torque requests and establishes real-time priority of control objectives. The examples provide wheel and body control allocation through precise coordination between sub-control modules to determine a final eLSD clutch torque and eLSD clutch torque adjustments. This coordination is efficient and includes gain scheduling and determining of slip targets for each wheel of the vehicle in real time. The gain scheduling may refer to amounts of output torque of torque sources (e.g., an internal combustion engine, one or more electric motors, etc.).

FIG. 1 shows a vehicle 100 including an example eLSD control system 102 having a vehicle control module 104 with powerhop module 105, a MbPPC module 106, the DYFC module 107, and the WSC module 108. The powerhop module 105 is configured to minimize hopping of wheels due to a power hop event. The MbPPC module 106 establishes a baseline eLSD clutch torque target including calculating longitudinal, transient, steady-state, and tractive limit targets. These targets are determined to provide an eLSD clutch torque arbitration baseline within an integrated overall control framework. The DYFC module 107 controls yaw rate and side slip angle velocity. The DYFC module implements a feedback control process to control vehicle states including yaw rate and side slip angle velocity. The MbPPC module 106 and DYFC module 107 enhance overall vehicle stability through precise torque distribution to wheels of a corresponding axle.

The WSC module 108 controls wheel stability and minimizes slip between left and right wheels of an axle. The WSC module 108 is also configured to minimize slip in the wheel with high (or higher) traction (or friction forces between tire of wheel and road surface). This wheel is referred to as the high mu wheel. A high mu refers to a road surface with a high associated level of friction and thus a high amount of tire traction such as when driving on a dry asphalt road. A medium mu refers to a road surface with a medium associated level of friction and thus a medium amount of tire traction such as when driving on a gravel or wet road. A low mu refers to a road surface with a low associated level of friction and thus a low amount of tire traction such as when driving on an ice- or snow-covered road. The WSC module 108 is also able to influence an output of the DYFC module. The WSC module 108 coordinates with vehicle control by implementing appropriate gain scheduling and determining a slip target for each wheel.

The vehicle control module 104 determines a final arbitrated eLSD clutch torque based on a result of combining outputs of the powerhop module 105, the MbPPC module 106, DYFC module 107, and WSC module 108. The vehicle control module 104 when controlling eLSD clutch torque prioritizes powerhop events over other events warranting a change in eLSD clutch torque. Operations of the modules 104-108 are further described below.

The vehicle 100 further includes sensors 110, memory 112, an accelerator pedal actuator 114, a steering system 116, and a propulsion system 118. The sensors 110 may include wheel speed sensors 120, wheel acceleration sensors 121, a suspension acceleration sensor 122, a vehicle speed sensor 123, a yaw rate sensor 124, an inertial measurement unit (IMU) 125, a suspension velocity sensor 126, a ride height sensor 127, acceleration sensors (e.g., longitudinal and lateral acceleration sensors) 128, and other sensors 130 (e.g., eLSD clutch temperature sensors). The memory 112 may store sensor data 132, algorithms 134, applications 136, parameters 138, etc. The sensor data 132 may include data collected from the sensors 110 and/or other sensors, such as an accelerator position sensor 140 of the accelerator pedal actuator 114, and a steering angle sensor 142 of the steering system 116. The accelerator pedal actuator 114 and accelerator position sensor 140 and/or other devices referred to herein may be connected to the vehicle control module 104 via a controller area network (CAN) or other network bus 143. The algorithms 134 include the algorithms referred to herein that are implemented by the modules 104-108. The applications 136 may include the modules 105-108 and/or other applications.

The propulsion system 118 may include one or more torque sources, such as one or more motors and/or one or more engines (e.g., internal combustion engines). In the example shown in FIG. 1, the vehicle 100 includes an engine 150 and one or more motors 152. The torque sources are independently controlled. The propulsion system 118 includes a motor control system 154 that includes the one or more motors 152 and a motor control module 156 that may control operation of the one or more motors 152 based on signals from the vehicle control module 104.

The vehicle control module 104 may further include a mode selection module 160 and/or a parameter adjustment module 162. The modules 105-108 and 160 may select different operating modes.

Figure 2:
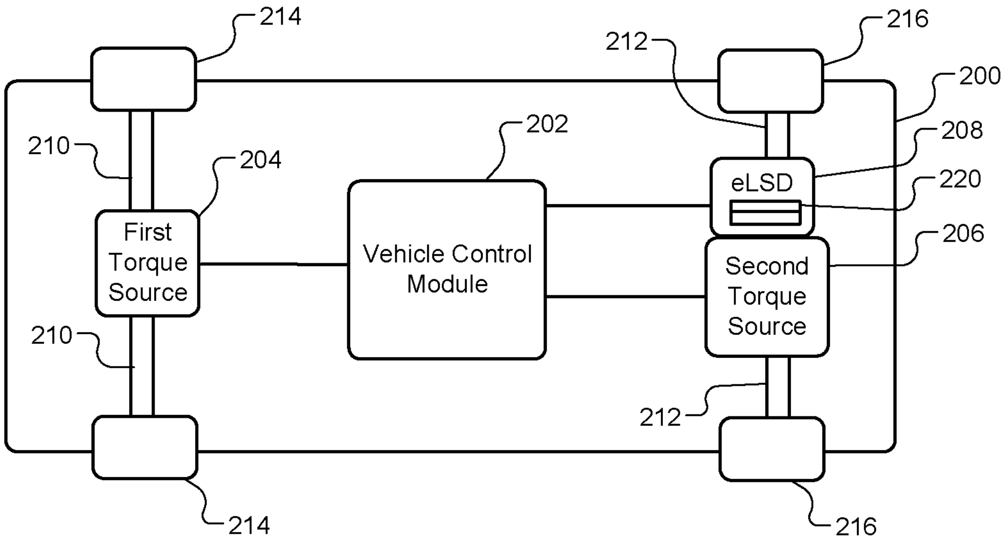
FIG. 2 is a functional block diagram of an example vehicle including a first torque source and a second torque source with an eLSD controlled via a vehicle control module in accordance with the present disclosure.

FIG. 2 shows a vehicle 200 including a vehicle control module 202, which controls operation of a first torque source 204, a second torque source 206, and an eLSD 208. FIG. 2 shows a vehicle 200 including independently controlled torque sources controlled via a vehicle control module 202. Each of the torque sources 204, 206 may be implemented as an engine or as a motor. The vehicle control module 202 may be configured and operate similarly as the vehicle control module 104 of FIG. 1. The vehicle control module 202 controls operation of the torque sources 204, 206 to control the amounts of torque received by one or more front axles (or shafts) 210 and one or more rear axles (or shafts) 212 and thus to left and right front wheels 214 and left and right rear wheels 216. The vehicle control module 202 controls distribution of torque to left and right rear wheels 216 by controlling the clutch torque of the eLSD 208, which adjusts pressure of a clutch 220 of the eLSD 208.

Figure 3:
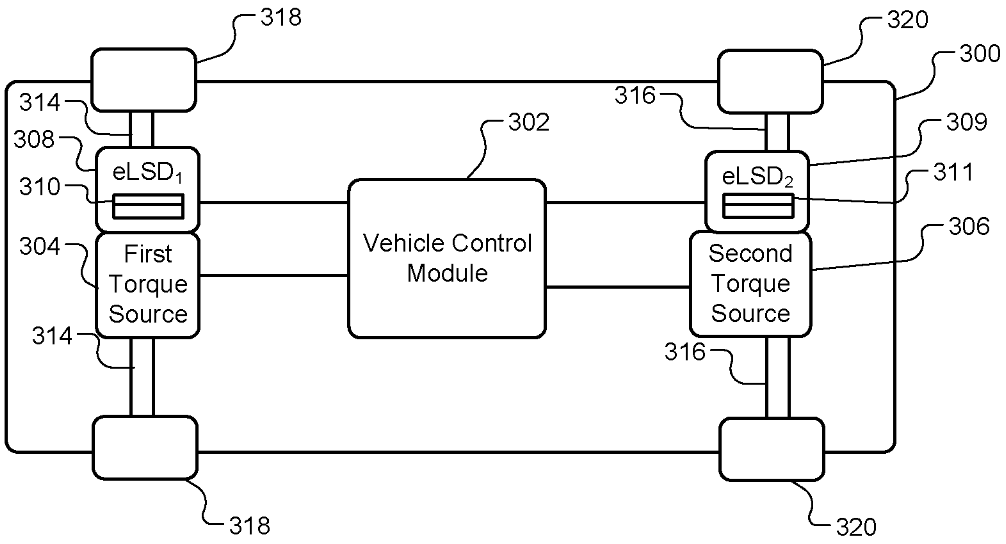
FIG. 3 is a functional block diagram of another example of a vehicle including multiple torque sources and eLSDs controlled via a vehicle control module in accordance with the present disclosure.

FIG. 3 shows a vehicle 300 including a vehicle control module 302, torque sources 304, 306 and respective eLSDs 308, 309, which are controlled by the vehicle control module 302. The eLSDs 308, 309 include respective clutches 310, 311. The vehicle control module 302 may be configured and operate similarly as the vehicle control module 104 of FIG. 1. The vehicle control module 302 controls operation of the torque sources to control the amounts of torque received by one or more front axles 314 and one or more rear axles 316 and thus to front wheels 318 and rear wheels 320.

Figure 4:
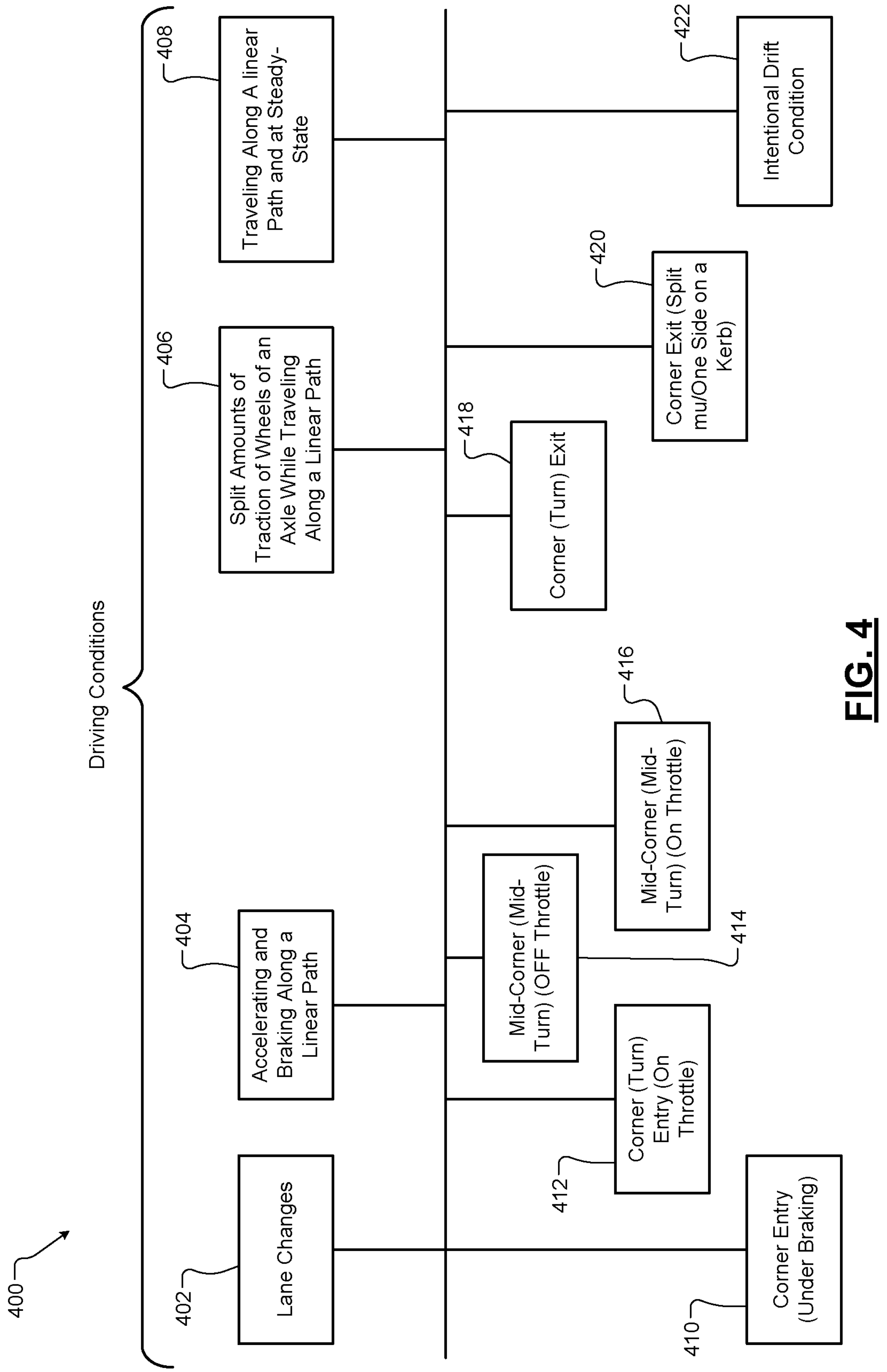
FIG. 4 is a diagram including different example driving conditions applicable for the eLSD control system disclosed herein.

FIG. 4 shows a diagram 400 including different driving conditions applicable for the eLSD control system 102 of FIG. 1. The eLSD control system 102 may be applied to lane changes 402, accelerating and braking along a linear path 404, split amounts of traction of wheels of an axle while traveling along a linear path 406, and traveling along a linear path and being in a steady-state 408. A split amount of traction (or split mu event) may occur when a first wheel of an axle is on a different surface than a second wheel of the axle. For example, when the first wheel is on asphalt and the second wheel is on gravel. As another example, when the first wheel is on an iced over surface and the second wheel is on asphalt.

The driving conditions further includes when a vehicle is entering a corner (or turn) and braking (designated 410), when the vehicle is moving around a corner (or turning) and a throttle of the vehicle is depressed (designated 412), when the vehicle is in a middle of a corner (or turn) and off the throttle (designated 414), when the vehicle is in a middle of a corner (or turn) and is on the throttle (designated 416), when the vehicle is exiting a corner (or turn) (designated 418), when the vehicle is exiting the corner (or turn) and is experiencing a split mu event (designated 420), and when the vehicle is experiencing a drift condition (designated 422). An example of driving condition 420 is when one wheel is on a kerb and the other wheel of the same axle is not on a kerb. During events 412, 414, 416 the disclosed control may reduce understeer of the vehicle while cornering by opening the eLSD clutch to allow wheels to rotate. During event 420, the disclosed control may determine an appropriate amount of left and right coupling to provide inside and outside wheel stability and balance.

Figure 5:
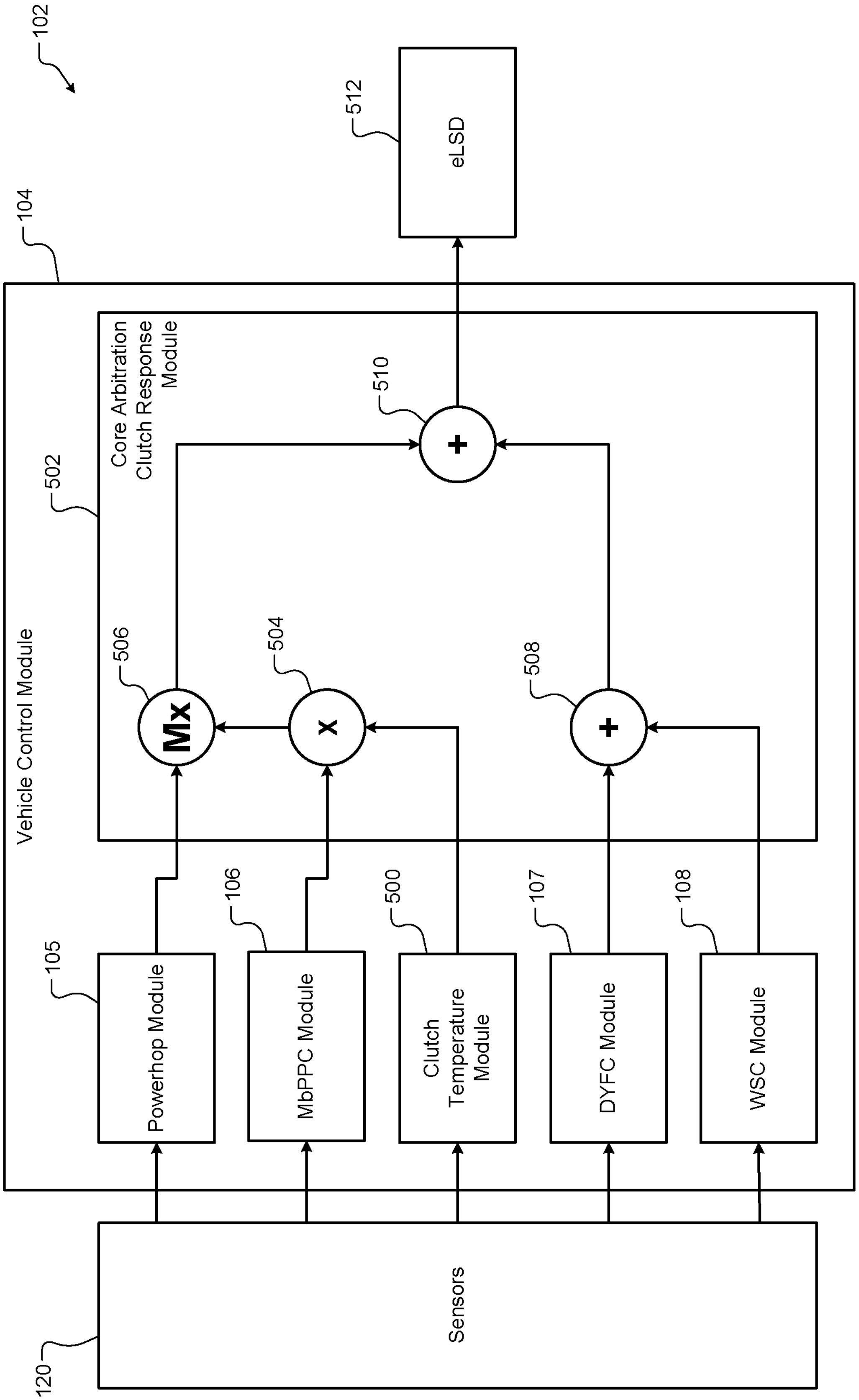
FIG. 5 is a functional block diagram of the eLSD control system of FIG. 1 in accordance with the present disclosure.

FIG. 5 shows the eLSD control system 102 of FIG. 1, which includes the modules 105, 106, 107, 108 and further includes a clutch temperature module 500 and a core arbitration clutch response module 502. The eLSD control system 102 is applicable to each eLSD included on a corresponding vehicle. If more than one eLSD is included, the operations described with respect to FIGS. 5-10 may be performed for each eLSD. The vehicle control module 104 receives outputs from the sensors 110. Each of the modules 105-108 and 500 receives as inputs at least some of the outputs and may receive other inputs referred to below.

Each of the modules 105-108 may receive inputs including i) an estimation of propulsion torque for a torque source, and ii) an estimation of brake torque on each wheel of the corresponding front or rear axle. These inputs may be estimated by the vehicle control module 104. The powerhop module 105 may receive outputs from the wheel speed sensors 120, wheel acceleration sensors 121, suspension velocity sensor 126, suspension acceleration sensor 122, ride height sensor 127. The powerhop module 105, based on these outputs and stated inputs, generates an eLSD clutch torque output (or clutch torque request, which may be in newton meters (Nm)). The powerhop module 105 has arbitration priority.

The MbPPC module 106 may receive outputs from the wheel speed sensors 120, an output of the steering angle sensor 142, and an output of the IMU 125. The MbPPC module 106 based on these outputs and stated inputs generates an eLSD clutch torque output (or clutch torque request, which may be in Nm). The MbPPC module 106 provides longitudinal, steady-state, and transients targets for eLSD clutch response as further described below with respect to FIG. 6.

The DYFC module 107 may receive outputs of the steering angle sensor 142, the IMU 125, and the vehicle speed sensor 123. The DYFC module 107 based on these outputs and stated inputs generates an eLSD clutch torque output (or clutch torque request, which may be in Nm). The eLSD clutch torque output may be referred to as an eLSD clutch slip control torque output. The DYFC module 107 tracks a desired (or target) yaw rate and provides an eLSD clutch torque to reduce a yaw rate error. The yaw rate error is a difference between a target yaw rate and an actual yaw rate of the corresponding vehicle.

The WSC module 108 may receive outputs of the wheel speed sensors 120. The WSC module 108 based on these outputs and stated inputs generates an eLSD clutch torque output (or clutch torque request, which may be in Nm). The WSC module 108 provides a clutch torque to satisfy two targets. The clutch torque is provided to i) minimize slip between left and right wheels of an axle (e.g., a front axle or a rear axle), and ii) minimize slip on an outside and/or high mu wheel. The WSC module 108 minimizes slip in the clutch of the eLSD and gives priority to the high mu wheel to maintain traction at the high mu wheel.

The clutch temperature module 500 determines a temperature of the clutches of the one or more eLSDs. This may be done via eLSD clutch temperature sensors. The clutch temperature module 500 indicates whether an eLSD clutch is overheating and generates a scalar value based on whether an eLSD clutch is overheating. The scalar value is changed to allow the overheating eLSD clutch to cool down. For example, the scalar value may be decreased to reduce an amount of torque applied to a clutch of the eLSD to allow the overheating eLSD clutch to cool down.

The core arbitration clutch response module 502 i) multiplies outputs of the modules 106 and 500 via a multiplier 504 to provide a first product value, ii) multiplies the first product value by the output of the powerhop module 105 and a constant M via a second multiplier 506 to provide a second product value, iii) sums outputs of the modules 107, 108 via a first summer 508 to provide a first summed value, iv) and sums the second product value and the output of the first summer 508 via a second summer 510 to provide a final eLSD clutch torque command value, which is provided to an eLSD 512. The final eLSD clutch torque command value may be provided to a controller or an actuator of the eLSD 512.

Figure 6:
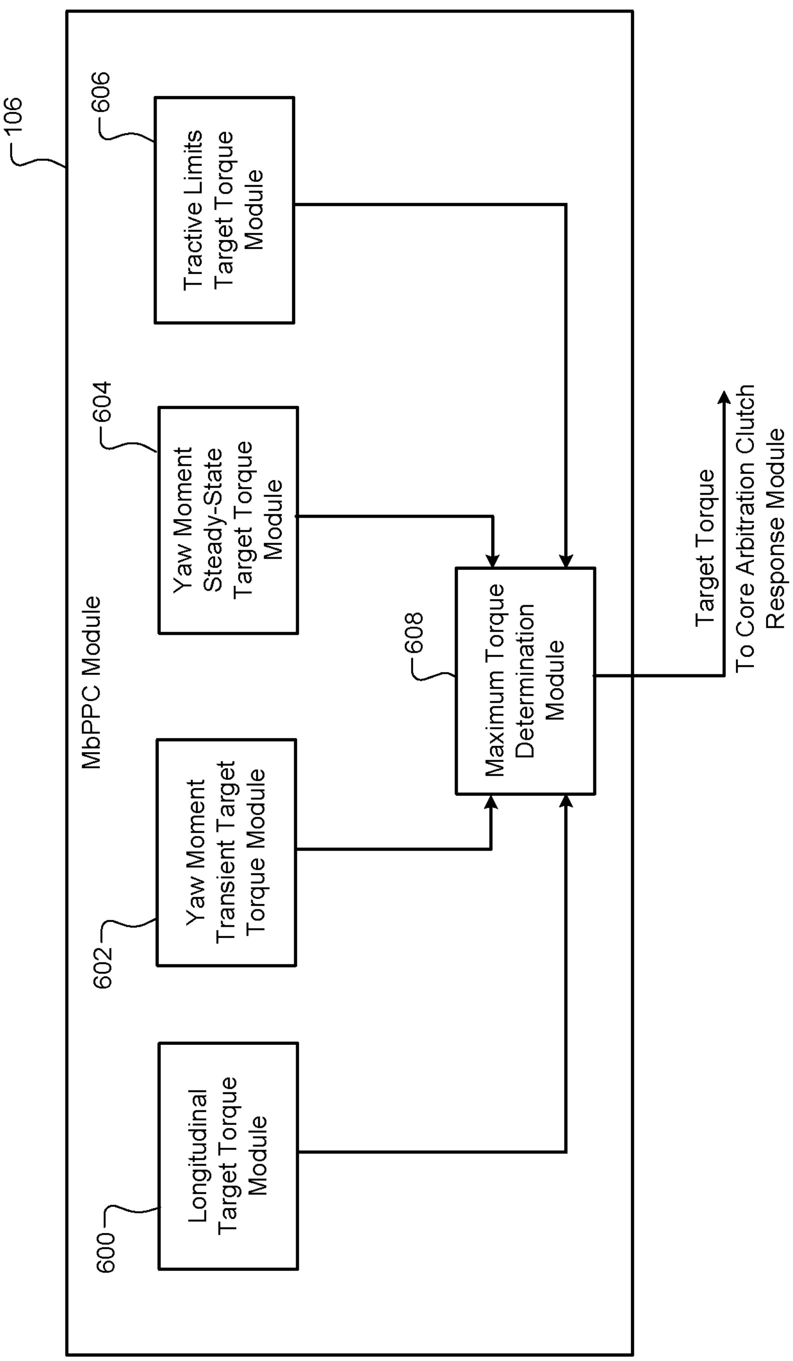
FIG. 6 is a functional block diagram of the MbPPC module of FIGS. 1 and 5 in accordance with the present disclosure.

FIG. 6 shows the MbPPC module 106 of FIGS. 1 and 5 may include a longitudinal target torque module 600, a yaw moment transient target torque module 602, a yaw moment steady-state target torque module 604, a tractive limits target torque module 606, and a maximum torque determination module 608.

The longitudinal target torque module 600 determines a longitudinal baseline target eLSD clutch torque as a function of i) torque requests for a corresponding axle (e.g., front axle or rear axle) of a corresponding vehicle, and ii) vehicle velocity. The longitudinal baseline target eLSD clutch torque may be based on a steering angle gain and a tire temperature gain. The steering angle gain is a function of front road wheel angle and vehicle velocity. The tire temperature gain is a function of tire temperature and lateral acceleration. The longitudinal baseline target eLSD clutch torque may be a steady-state preload target eLSD clutch torque for high speeds and highway driving. The longitudinal baseline target eLSD clutch torque provides a minimal amount of eLSD clutch torque to minimize response time when a driver implements a dynamic operation such as accelerating the vehicle or turning the vehicle at high speeds. The longitudinal baseline target eLSD clutch torque is primarily for instances when the vehicle is traveling along a linear path.

The yaw moment transient target torque module 602 determines a yaw moment transient target eLSD clutch torque to tune the vehicle balance during highly transient maneuvers (e.g., lane changes). This is most effective during initial turn-ins when tires experience a delay in generating lateral force (i.e., relaxation length). The yaw moment transient target eLSD clutch torque is based on at least one of a yaw acceleration error and a target yaw acceleration. The yaw acceleration error is a difference between the target yaw acceleration and actual yaw acceleration of the vehicle. For a given vehicle speed, if the steering angle is changed quickly, there is a tendency for the vehicle to slide. When the steering angle is detected as being changed quickly, the yaw moment transient target torque module 602 increases the amount of eLSD clutch torque to improve vehicle stability and stop the vehicle from sliding. If the steering angle change is smooth and not changed too quickly, the yaw moment transient target torque module 602 does not increase the amount of eLSD clutch torque. The operations of the yaw moment transient target torque module 602 are especially applicable for lane changes.

Yaw dynamics of a vehicle may be represented by equation 1, where $I_z$ is yaw inertia, r is yaw rate, $\dot{r}$ is yaw rate gradient, $l_f$ and $l_r$ are distances from center of gravity of vehicle to front and rear suspensions of the vehicle, $F_{yLF}$ and $F_{yRF}$ are left and right lateral tire forces for a front axle of the vehicle, $F_{yLR}$ and $F_{yRR}$ are left and right lateral tire forces for a rear axle of the vehicle, and $M_z$ is yaw moment.

$$I_z\dot{r} = l_f\,(F_{yLF} + F_{yRF}) - l_r\,(F_{yLR} + F_{yRR}) + M_z \tag{1}$$

During an initial turn-in, there is a certain delay between a driver turning the steering wheel and the vehicle generating yaw moment. Thus, under transient conditions due to this delay a direct yaw moment (torque vectoring) is used to meet expectations of the driver. Hence, under such conditions equation 1 can be simplified to provide equation 2, where, $\dot{r}_{desired}$ is generated by taking a derivative of a driver's desired yaw rate.

$$I_z\dot{r}_{desired} \approx M_z \tag{2}$$

The dynamics of a driver's desired yaw rate (or lateral acceleration) and steering wheel angle velocity (or speed of change in steering wheel angle) are similar and can be represented by equation 3, having a derivative represented by equation 4, where δ and δ are a steering wheel angle and its gradient, L is a total distance between the front and rear suspensions, and V and $\dot{V}$ are a longitudinal velocity and its gradient. The yaw moment transient target eLSD clutch torque may be determined based on the desired yaw rate and/or the derivative thereof.

$$r_{desired} = \frac{\delta}{L}V \tag{3}$$

$$\frac{d\,(r_{desired})}{dt} = \frac{1}{L}\left(\dot{\delta}V + \dot{V}\delta\right) \tag{4}$$

The yaw moment steady-state target torque module 604 determines a yaw moment steady-state target eLSD clutch torque. The yaw moment steady-state target torque module 604 is designed primarily for steady-state handling balance of vehicle during partial or off throttle instances, such as when the vehicle is in a middle of a turn and is experiencing a maximum level of lateral acceleration. The yaw moment steady-state target torque module 604 balances a vehicle when the vehicle is in a turn. As the steering angle stops changing and yaw is at steady-state during a turn, the vehicle control module 104 transitions to providing the output of the yaw moment steady-state target torque module 604 and corresponding yaw moment steady-state target eLSD torque. As the vehicle becomes stabilized and in steady-state, the more eLSD coupling, the more understeer. The steady-state target may be provided during a middle of a turn based on geometry of the turn and speed of vehicle through the turn to adjust the amount of understeer. This may be based on a vehicle model. The steady-state target is especially effective in high-speed high acceleration (or high g) turns. The steady-state target correlates a transfer function between a steering angle and an external yaw moment of the vehicle. The outputs of the modules 602, 604 may be based on how fast and how much the steering angle has changed for a given vehicle speed.

FIG. 7 shows a diagram illustrating lateral forces experienced by front and rear wheels of a vehicle. The lateral dynamics of a vehicle may be represented by equations 5 and 6, where β and $\dot{\beta}$ are side slip angle and its gradient.

$$mV\left(\dot{\beta} + r\right) = F_{yLF} + F_{yRF} + F_{yLR} + F_{yRR} \tag{5}$$

$$I_z\dot{r} = l_f\,(F_{yLF} + F_{yRF}) - l_r\,(F_{yLR} + F_{yRR}) + M_z \tag{6}$$

The lateral force can be modeled as a linear function of lateral slip based on equations 7-10, where $C_f$ and $C_r$ are front and rear suspension corner stiffnesses, and $\alpha_F$ and $\alpha_r$ are front and rear wheel slip angles.

$$F_{\frac{yLF}{RF}} = C_f\alpha_f \tag{7}$$

$$F_{yLR/RR} = C_r\alpha_r \tag{8}$$

$$\alpha_f = \delta_f - \beta - \frac{l_f r}{V} \tag{9}$$

$$\alpha_r = \delta_r - \beta + \frac{l_f r}{V} \tag{10}$$

The linear model in state-space form can be defined by equation 11, where m is vehicle mass.

$$\begin{bmatrix}\dot{\beta}\\ \dot{r}\end{bmatrix} = \begin{bmatrix} -\frac{2\,(C_f + C_r)}{mV} & -1 - \frac{2\,(l_fC_f - l_rC_r)}{mV^2} \\ -\frac{2\,(l_fC_f - l_rC_r)}{I_z} & -\frac{2\left(l_f^2C_f - l_r^2C_r\right)}{I_zV}\end{bmatrix}\begin{bmatrix}\beta\\ r\end{bmatrix} + \begin{bmatrix}\frac{2C_f}{mV}\\ \frac{2\,l_fC_f}{I_z}\end{bmatrix}[\delta_f] + \begin{bmatrix}\frac{2C_r}{mV}\\ -\frac{2\,l_rC_r}{I_z}\end{bmatrix}[\delta_r] + \begin{bmatrix}0\\ \frac{1}{I_z}\end{bmatrix}[M_Z] \tag{11}$$

The effect of various actuators on the total yaw rate of the vehicle can be written as equation 12, where $\delta_f$ and $\delta_r$ are front and rear steering wheel angles, and $$G^r_{\delta_f},\ G^r_{\delta_r},\ G^r_{M_z}$$

are the steady-state gains for yaw rate with respect to front steering, rear steering and external yaw moment.

$$r = \delta_fG^r_{\delta_f} + \delta_rG^r_{\delta_r} + M_zG^r_{M_z} \tag{12}$$

Considering the vehicle is at steady-state the state derivatives can be put to 0, and the steady-state gains can be calculated using equations 13-15, where $$G^{\beta}_{\delta_f}, G^{\beta}_{\delta_r}, G^{r}_{M_z}$$

are the steady-state gains for side slip with respect to front steering, rear steering and external yaw moment and used to provide the yaw moment steady-state target eLSD clutch torque.

$$G^{r}_{\delta_f} = \frac{2VC_fC_r(l_f + l_r)}{2C_fC_rl_f^2 + 4C_fC_rl_fl_r - mC_fl_fV^2 + 2C_fC_rl_r^2 + mC_rl_rV^2} \quad (13)$$

$$G^{r}_{\delta_r} = -\frac{2VC_fC_r(l_f + l_r)}{2C_fC_rl_f^2 + 4C_fC_rl_fl_r - mC_fl_fV^2 + 2C_fC_rl_r^2 + mC_rl_rV^2} \quad (14)$$

$$G^{r}_{M_z} = \frac{V(C_f + C_r)}{2C_fC_rl_f^2 + 4C_fC_rl_fl_r - mC_fl_fV^2 + 2C_fC_rl_r^2 + mC_rl_rV^2} \quad (15)$$

The tractive limits target torque module 606 determines tractive limits target eLSD clutch torque. The tractive limits target torque module 606 is designed for achieving vehicle and wheel stability during on throttle instances (e.g., when exiting a turn). The tractive limits target is used when the vehicle is exiting a turn and reduces lap times of a vehicle traveling around a racetrack. The algorithm of the tractive limits target torque module 606 uses a model based tractive limit estimation coupled with a redistribution logic to allow improved traction across left and right wheels of an axle. The tractive limits target torque module 606 adjusts an amount of coupling between left and right shafts of an axle such that the wheel with less traction (or grip) does not spin. The amount of eLSD clutch torque is limited to limit amount of torque received at high mu wheel.

The maximum torque determination module 608 receives the target eLSD clutch torques output from the modules 600, 602, 604, 606 and determines which one of the outputs is largest. The largest (or maximum) of the outputs is provided to the core arbitration clutch response module 502 of FIG. 5. The maximum output is provided to the multiplier 504. By finding the maximum of the outputs, the maximum torque determination module 608 satisfies the targets of the modules 602, 604, 606 and provide the baseline clutch torque response.

The eLSD feedforward clutch torque provided by the maximum torque determination module 608 establishes a longitudinal target, a transient target, and a steady-state target as a baseline of the clutch coupling torque response. The torque to provide lateral acceleration and slip control is added or subtracted to the baseline.

Figure 8:
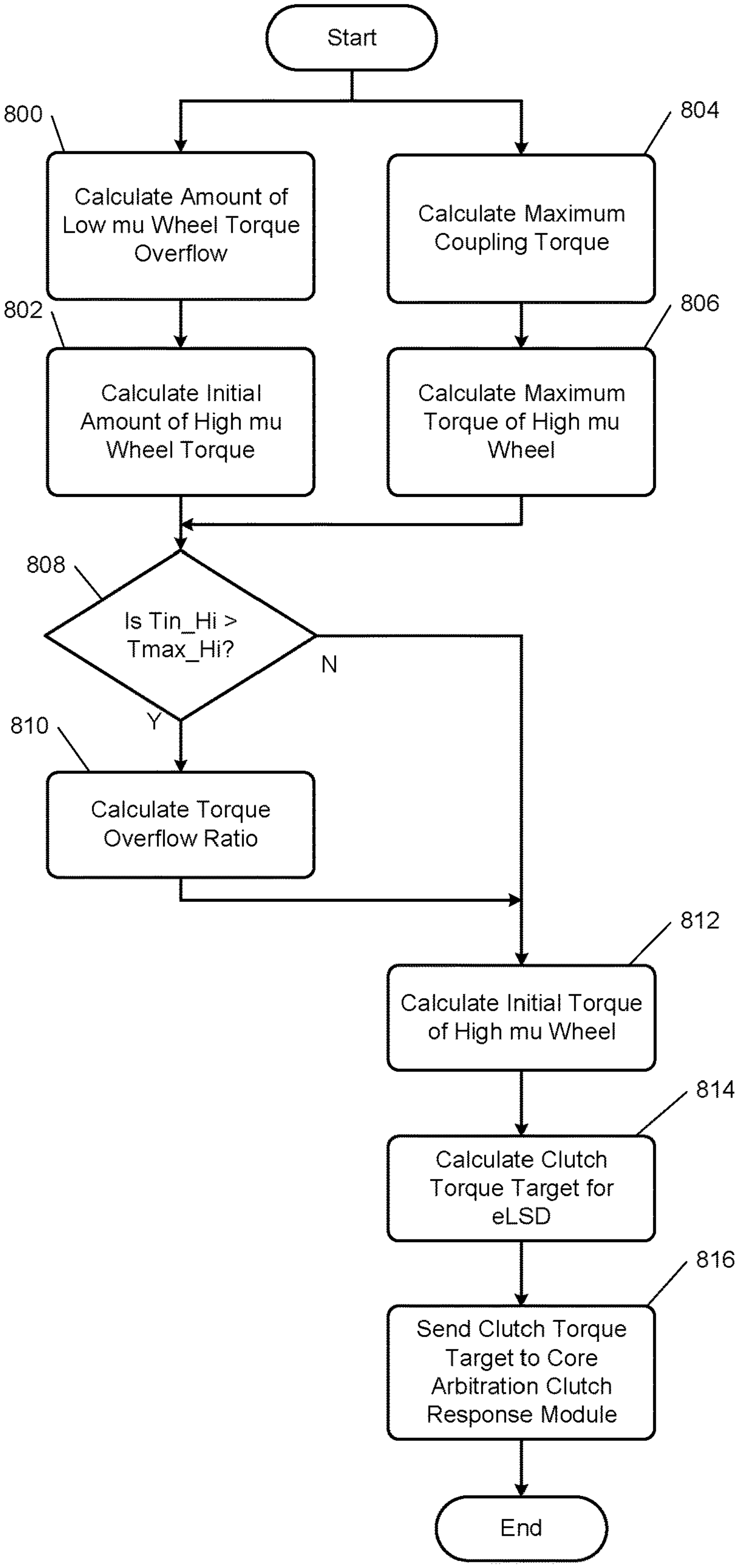
FIG. 8 illustrates an example tractive limits target method in accordance with the present disclosure.

FIG. 8 shows a tractive limits target method may be implemented by the tractive limits target torque module 606 of the MbPPC module 106 of FIGS. 1 and 5-6. At 800, the tractive limits target torque module 606 calculates an amount of low mu wheel torque overflow Ofl_lo, which may be equal to i) 0.5*T_Axl−TL_Lo, where T_Axl is a total axle torque and TL_Lo is a tractive limit for low mu wheel, or ii) a maximum of CT_Lo and 0, where CT_Lo is the coupling torque for the low mu wheel. At 802, the tractive limits target torque module 606 calculates an initial amount of high mu wheel torque Tin_Hi. This may be equal to 0.5*T_Axl+Ofl_Lo.

At 804, the tractive limits target torque module 606 calculates a maximum coupling torque CT_Max. CT_Max may be equal to 0.5*T_Axl+Cal Offset, where Cal Offset is a calibration offset value. At 806, the tractive limits target torque module 606 calculates a maximum torque TMax_Hi of high mu wheel. TMax_Hi may be equal to a minimum of TL_Hi and CT_Max, where TL_Hi is a tractive limit for the high mu wheel and CT_Max is a maximum coupling torque.

At 808, the tractive limits target torque module 606 determines whether a torque request input Tin_Hi for the high mu wheel is greater than a torque request maximum Tmax_Hi for the high mu wheel. If yes, operation 810 is performed, otherwise operation 812 is performed. If not, an overflow torque Ofl_Hi for the high mu wheel may be equal to 0. At 810, the tractive limits target torque module 606 calculates the overflow torque Ofl_Hi for the high mu wheel. Ofl_Hi may be equal to a maximum of 0 and a difference between Tin_hi and TMax_Hi. In an embodiment, Ofl_Hi is multiplied by an overflow calibration ratio.

At 812, the tractive limits target torque module 606 calculates an initial torque request output TOut_Hi for the high mu wheel. TOut_Hi may be equal to a sum of Ofl_Hi and a minimum of Tin_Hi and TMax_Hi. At 814, the tractive limits target torque module 606 calculates a clutch torque coupling target CT_Tgt for the eLSD. CT_Tgt may be equal to 2*(TOut_Hi−0.5*T_Axl), where TOut_Hi is a torque request output for a high mu wheel. At 816, the tractive limits target torque module 606 sends the clutch torque target to the core arbitration clutch response module 502.

Figure 9:
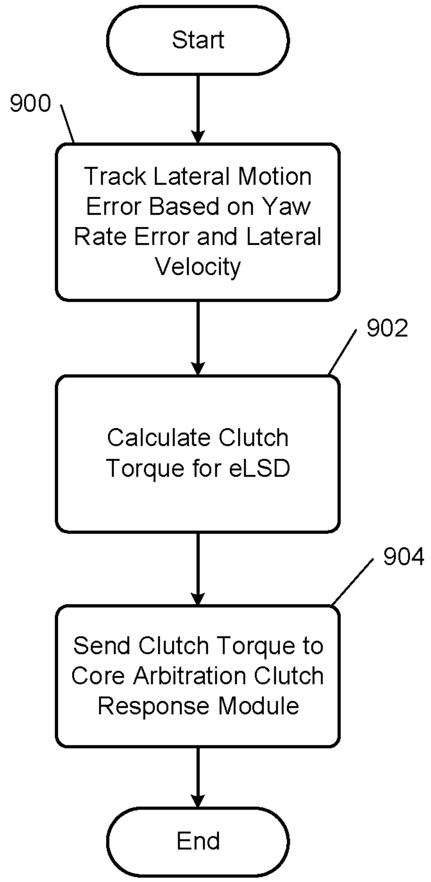
FIG. 9 illustrates an example DYFC method in accordance with the present disclosure.

FIG. 9 shows a DYFC method. The following operations may be performed by the DYFC module 107 of FIGS. 1 and 5. At 900, the DYFC module 107 tracks lateral motion error including tracking yaw rate error and lateral velocity of the vehicle. At 902, the DYFC module 107 calculates an eLSD clutch torque value to correct the yaw rate error. The eLSD clutch torque value is determined based on the yaw rate error and the lateral velocity.

In an embodiment, the DYFC module 107, during operations 900 and 902, tracks the yaw rate error (difference between desired (or target) yaw rate and actual vehicle yaw rate), and operates as a proportional derivative (PD) controller and corrects this yaw rate error. The yaw rate error is multiplied by a slip gain, a clutch torque adjustment gain and a tire temperature gain to determine a torque vectoring yaw rate error target. The eLSD clutch torque value is generated based on the yaw rate error target.

At 904, the DYFC module 107 sends the eLSD clutch torque value to the core arbitration clutch response module 502.

The described yaw control is provided via the eLSD to concurrently maintain vehicle yaw rate and stability. This prevents undesired yaw motion when a torque bias is implemented in the eLSD.

Figure 10:
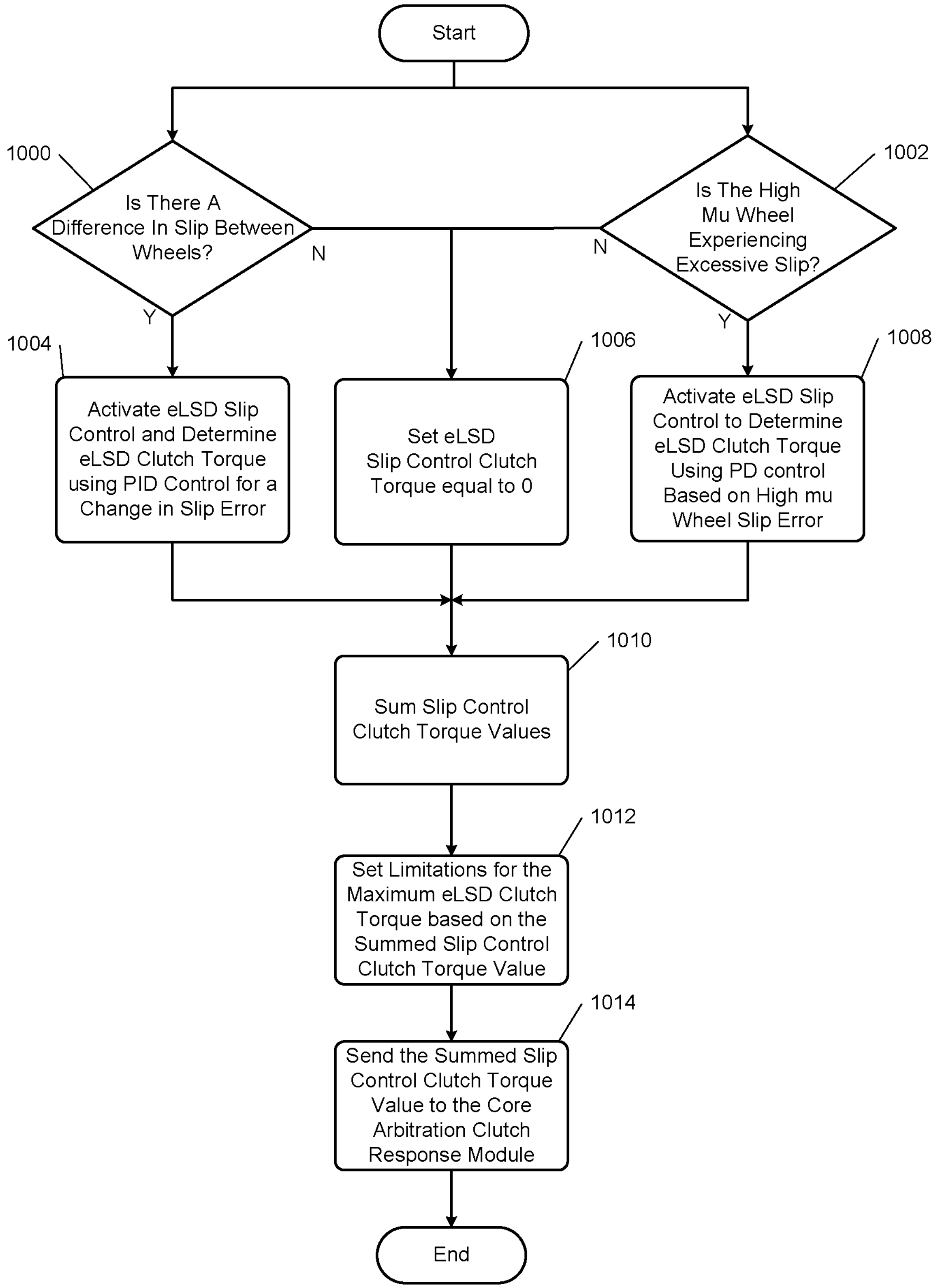
FIG. 10 illustrates an example WSC method in accordance with the present disclosure.

FIG. 10 shows a WSC method. The following operations may be performed by the WSC module 108 of FIGS. 1 and 5. Operations 1000 and 1002 may be performed concurrently. At 1000, the WSC module 108 determines whether a change in slip has occurred between wheels of an axle (e.g., front axle or rear axle) of a vehicle. If yes, operation 1004 is performed, otherwise operation 1006 is performed. At 1002, the WSC module 108 determines whether the high mu wheel is experiencing excessive slip. Excessive slip may be when slip is positive and greater than a predetermined amount, for example, when greater than 6-7%. If yes, operation 1008 is performed, otherwise operation 1006 is performed.

At 1004, the WSC module 108 activates eLSD slip control and operates as a proportional integral derivative (PID) controller to determine an eLSD clutch torque for a change in slip error. At 1006, the WSC module 108 eLSD slip control clutch torque is set equal to 0. At 1008, the WSC module 108 activates eLSD slip control and operates as a PD controller to determine eLSD clutch torque based on high mu wheel slip error.

At 1010, the WSC module 108 sums results of the one or more of the operations 1004, 1006, and 1008 that are performed to provide a summed eLSD slip control clutch torque value (or the eLSD clutch torque request for the WSC module 108). At 1012, the WSC module 108 sets limitations for a maximum eLSD clutch torque based on the summed eLSD control clutch torque value. At 1014, the WSC module 108 sends the summed eLSD slip control torque value to the core arbitration clutch response module 502.

The eLSD slip control provides clutch torque to reduce the change in slip error and high mu slip error. This control provides a balance between how much clutch coupling is added to mitigate that change in slip error, while at the same time limiting extra torque to not sacrifice traction at the high mu wheel. The WSC module 108 monitors wheel torque limits and maximizes torque provided to high mu wheel without causing excessive slip at the high mu wheel. This may be the outside wheel when the vehicle is in a turn. If the high mu wheel is experiencing excessive slip, the WSC module 108 adjusts gains to reduce coupling torque to the high mu wheel to reduce the amount of slip.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including “connected,” “engaged,” “coupled,” “adjacent,” “next to,” “on top of,” “above,” “below,” and “disposed.” Unless explicitly described as being “direct,” when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean “at least one of A, at least one of B, and at least one of C.”

In the figures, the direction of an arrow, as indicated by the arrowhead, generally demonstrates the flow of information (such as data or instructions) that is of interest to the illustration. For example, when element A and element B exchange a variety of information, but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term “module” or the term “controller” may be replaced with the term “circuit.” The term “module” may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. An electronic limited slip differential (eLSD) control system comprising:

an eLSD configured to adjust torque to a plurality of shafts of an axle of a vehicle;

a preemptive planar coordinator module configured to determine a plurality of different targets for an eLSD clutch torque and generate a first clutch torque request based on the plurality of different targets;

a direct yaw feedback control module configured to track a target yaw rate for the vehicle, determine a yaw rate error, and generates a second clutch torque request to reduce the yaw rate error;

a wheel stability control module configured to generate a third clutch torque request to minimize at least one of i) slip between wheels of the axle, and ii) slip on one of the wheels experiencing higher traction; and a core arbitration clutch response module configured to control the eLSD clutch torque of the eLSD based on the first clutch torque request, the second clutch torque request, and the third clutch torque request.

2. The eLSD control system of claim 1, wherein the preemptive planar coordinator module is configured to:

determine a longitudinal target, which is a steady-state preload target eLSD clutch torque that provides a minimal amount of eLSD clutch torque to minimize response time when a driver implements a dynamic operation, a yaw moment transient target, which is an eLSD clutch torque that is based on at least one of a yaw acceleration error and a target yaw acceleration of the vehicle, and a yaw moment steady-state target, which is an eLSD clutch torque provided when yaw is at steady-state; and generate the first clutch torque request based on the longitudinal target, the yaw moment transient target, and the yaw moment steady-state target.

3. The eLSD control system of claim 2, wherein:

the preemptive planar coordinator module is configured to determine a tractive limits target and based on the tractive limits target generates the first clutch torque request; and the plurality of different targets comprise the tractive limits target.

4. The eLSD control system of claim 2, wherein the preemptive planar coordinator module is configured to determine the longitudinal target based on speeds of the wheels, accelerations of the wheels, velocity of a suspension of the vehicle, acceleration of the suspension of the vehicle, and a ride height of the vehicle.

5. The eLSD control system of claim 2, wherein the preemptive planar coordinator module is configured to determine the longitudinal target as a baseline target that is a function of a torque request for the axle and velocity of the vehicle.

6. The eLSD control system of claim 2, wherein the preemptive planar coordinator module is configured to determine the longitudinal target based on a steering angle gain and a tire temperature gain.

7. The eLSD control system of claim 2, wherein the preemptive planar coordinator module is configured to determine the yaw moment transient target based on at least one of a yaw acceleration error or a target yaw acceleration of the vehicle.

8. The eLSD control system of claim 2, the preemptive planar coordinator module is configured to determine the yaw moment steady-state target to correlate a transfer function between steering angle and a yaw moment of the vehicle.

9. The eLSD control system of claim 2, wherein the preemptive planar coordinator module is configured to select a maximum of the longitudinal target, the yaw moment transient target, and the yaw moment steady-state target as the first clutch torque request.

10. The eLSD control system of claim 1, further comprising a powerhop module configured to detect a powerhop event and generate a fourth clutch torque request to minimize duration of the powerhop event, wherein the core arbitration clutch response module is configured to control the eLSD clutch torque of the eLSD based on the fourth clutch torque request.

11. The eLSD control system of claim 10, wherein the core arbitration clutch response module is configured to prioritize the fourth clutch torque request over the first clutch torque request, the second clutch torque request and the third clutch torque request.

12. The eLSD control system of claim 11, further comprising a clutch temperature module configured to generate a scalar value based on a temperature of a clutch of the eLSD, wherein the core arbitration clutch response module comprises a first multiplier configured to multiply the scalar value by the first clutch torque request to provide a first product value, a second multiplier configured to multiply the first product value by the fourth clutch torque request to generate a second product value, a first summer configured to sum the second clutch torque request and the third clutch torque request to provide a summed value, and a second summer configured to sum the second product value and the summed value to generate a command to control the eLSD clutch torque of the eLSD.

13. A method of controlling an electronic limited slip differential (eLSD) of a vehicle, the method comprising:

determining a plurality of different targets for an eLSD clutch torque and generating a first clutch torque request based on the plurality of different targets;

tracking a target yaw rate for the vehicle;

determining a yaw rate error;

generating a second clutch torque request to reduce the yaw rate error;

generating a third clutch torque request to minimize at least one of i) slip between wheels of an axle of the vehicle, and ii) slip on a first one of the wheels experiencing higher traction; and controlling the eLSD clutch torque of the eLSD based on the first clutch torque request, the second clutch torque request, and the third clutch torque request.

14. The method of claim 13, wherein determining the plurality of different targets comprise:

calculating an amount of wheel torque overflow of a second one of the wheels experiencing a lower amount of traction;

calculating an amount of initial wheel torque at the first one of the wheels based on the amount of the wheel torque overflow;

calculating a maximum coupling torque of a clutch of the eLSD;

calculating a maximum torque of the first one of the wheels based on the maximum coupling torque; and calculating the first clutch torque request based on the amount of the initial wheel torque and the maximum torque of the first one of the wheels.

15. The method of claim 14, further comprising:

determining whether the amount of the initial wheel torque is greater than the maximum torque of the first one of the wheels;

calculating the first clutch torque request based on an overflow torque of the first one of the wheels when the amount of the initial wheel torque is greater than the maximum torque of the first one of the wheels, wherein the overflow torque of the first one of the wheels is greater than 0; and calculating the first clutch torque request based on a minimum of the amount of the initial wheel torque and the maximum torque of the first one of the wheels.

16. The method of claim 13, further comprising:

tracking lateral motion error based on the yaw rate error and a lateral velocity of the vehicle; and calculating the second clutch torque request based on the lateral motion error.

17. The method of claim 13, further comprising:

determining whether there is a difference in slip between the wheels;

determining whether the first one of the wheels is experiencing excessive slip;

activating eLSD slip control in response to there being a difference in slip between the wheels and in response to the first one of the wheels experiencing excessive slip, and determining the third clutch torque request based on at least one of a change in slip error and a slip error in the first one of the wheels; and setting the third clutch torque request equal to 0 when there is no difference in slip between the wheels and when the first one of the wheels is not experiencing excessive slip.

18. The method of claim 13, further comprising:

determining a longitudinal target, a yaw moment transient target, and a yaw moment steady-state target; and generating the first clutch torque request based on the longitudinal target, the yaw moment transient target, and the yaw moment steady-state target.

19. The method of claim 18, further comprising:

determining a tractive limits target and, based on the tractive limits target, generating the first clutch torque request, where the plurality of different targets comprise the tractive limits target;

detecting a powerhop event and generating a fourth clutch torque request to minimize duration of the powerhop event; and controlling the eLSD clutch torque of the eLSD based on the fourth clutch torque request.

20. The eLSD control system of claim 1, wherein the core arbitration clutch response module is configured to control the eLSD clutch torque of the eLSD based on the first clutch torque request, the second clutch torque request, and the third clutch torque request, concurrently.

* * * * *